W. I. TWOMBLY.
MOTOR VEHICLE.
APPLICATION FILED FEB. 19, 1912.
1,126,592.
Patented Jan. 26, 1915.
3 SHEETS—SHEET 3.
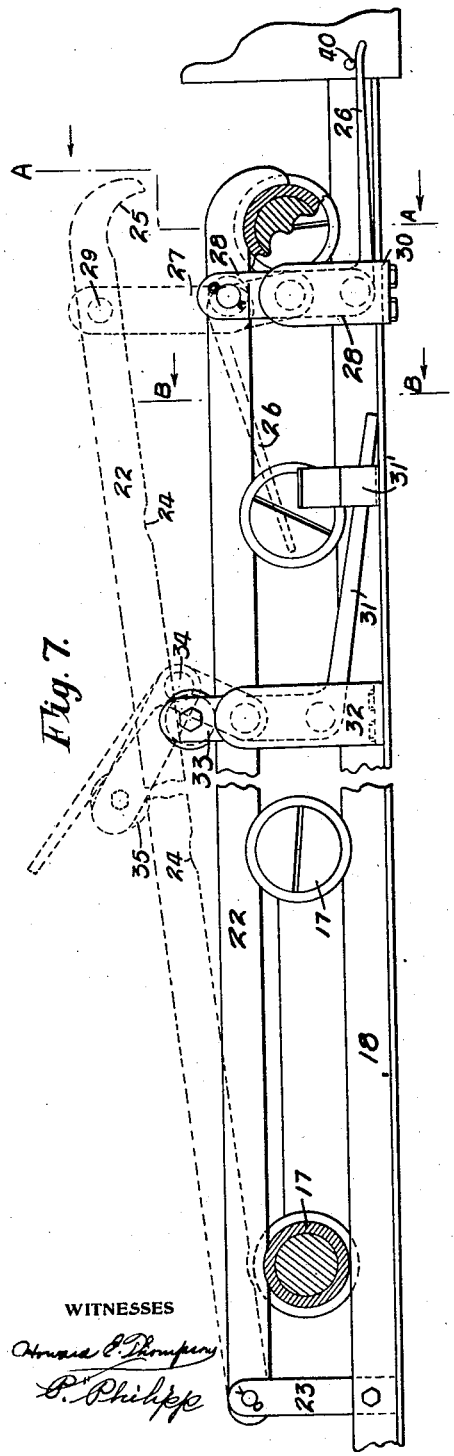
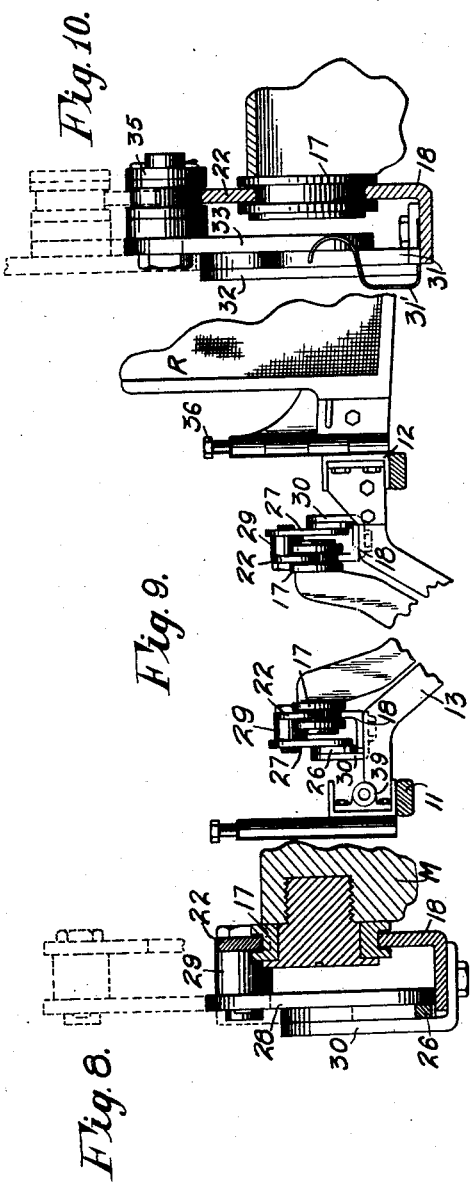
WITNESSES
INVENTOR:
BY Willard Irving Twombly.
ATTORNEY

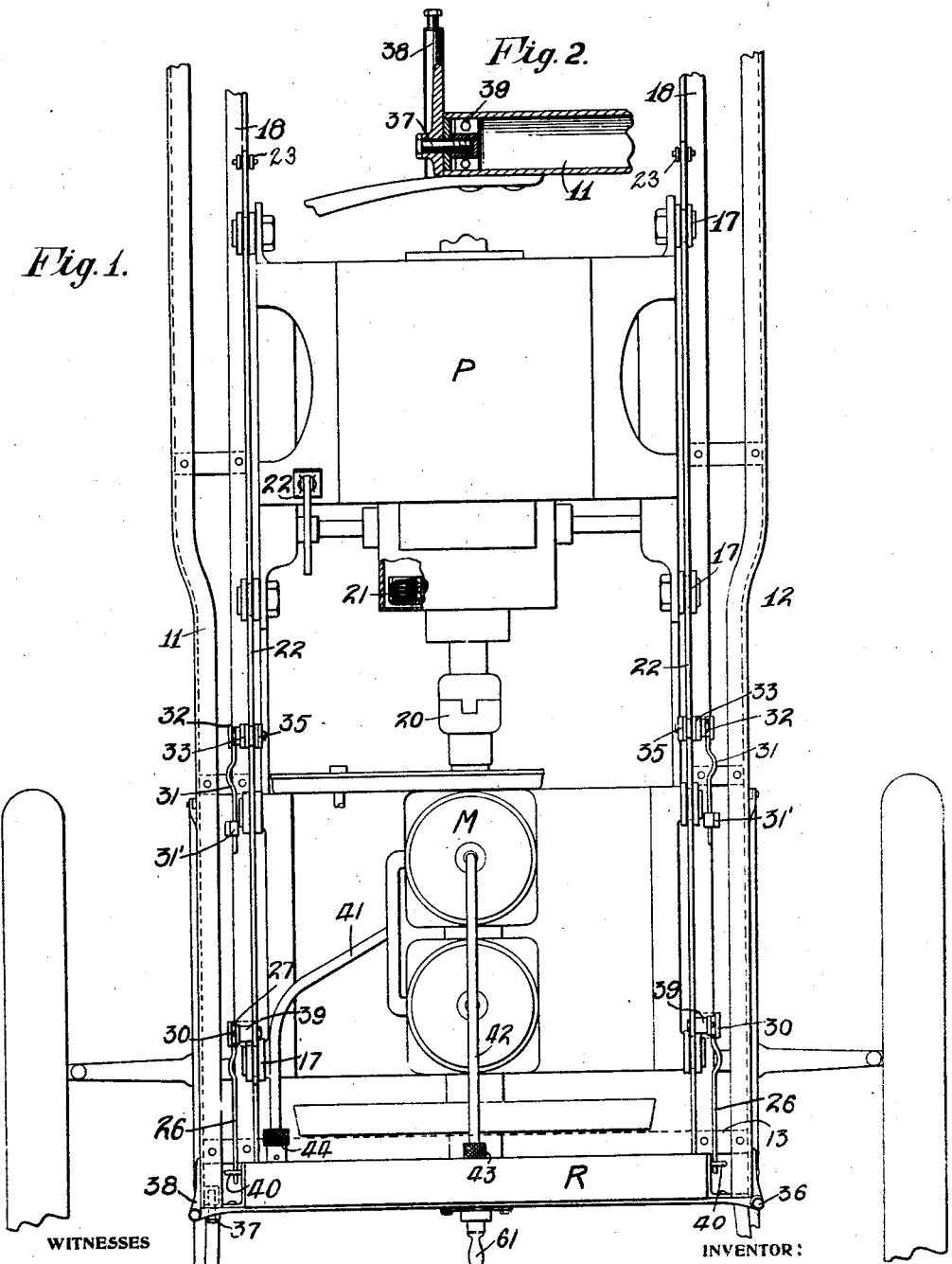

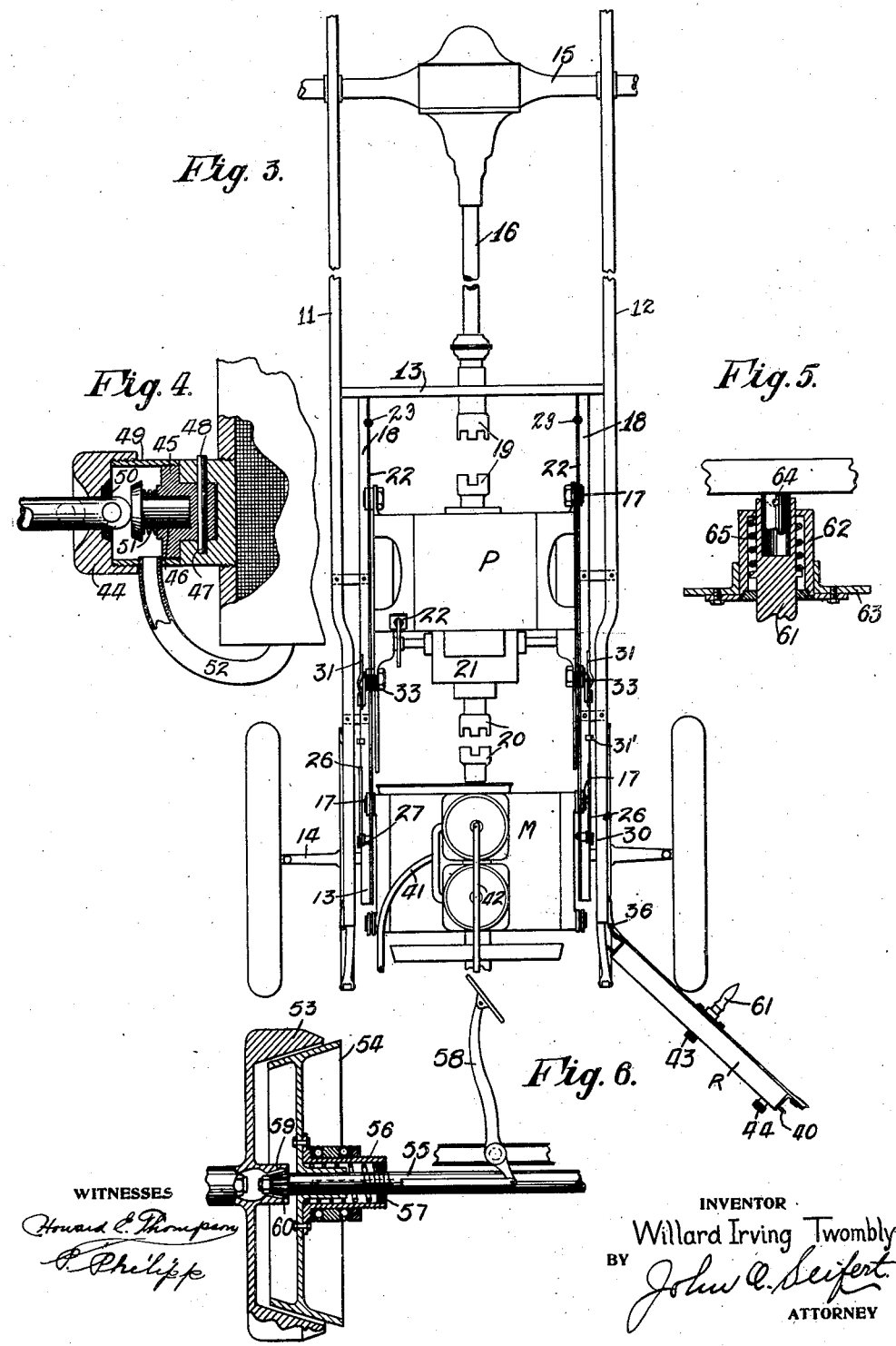

UNITED STATES PATENT OFFICE.

WILLARD IRVING TWOMBLY, OF NEW YORK, N. Y., ASSIGNOR TO TWOMBLY MOTORS COMPANY, OF NEW YORK, N. Y., A CORPORATION OF NEW YORK.

MOTOR-VEHICLE.

1,126,592.  Specification of Letters Patent.  Patented Jan. 26, 1915.

Application filed February 19, 1912. Serial No. 678,653.

*To all whom it may concern:*

Be it known that I, WILLARD IRVING TWOMBLY, a citizen of the United States, residing in the borough of Manhattan, in the city, county, and State of New York, have invented new and useful Improvements in Motor-Vehicles, of which the following is a specification.

This invention relates to motor vehicle construction, and particularly to motor vehicles in which the power plant, consisting of a motor and a power transmission mechanism, is arranged to be readily and quickly placed in position in a vehicle frame and as readily removed therefrom for the purpose of making repairs or the substitution of another power plant, and it is the object of the invention to provide an improved motor vehicle in which the motor and power transmission mechanism are separately and independently removable units so that should the motor or the power transmission mechanism break down either may be removed and another substituted without the necessity of keeping both idle.

A further object of the invention relates to means to maintain the motor and power transmission mechanism in rigid position in the vehicle frame with the shafts thereof in true alinement.

Another object of the invention relates to the mounting of a water cooler or radiator at the front of the vehicle frame so that it may be swung away from the front of the power plant to permit of the placing of the latter into and the removal thereof from the frame, couplings being provided between the motor and cooler whereby the cooler is automatically coupled with the motor as it is swung into position in front of the motor, and automatically uncoupled from the motor and the flow of water shut off from the cooler when it is swung away from the front of the motor preparatory to the removal of the power plant.

In the drawings accompanying and forming a part of this specification, Figure 1 is a plan view of the forward portion of a vehicle frame showing my improved manner of removably mounting the power plant therein. Fig. 2 is a sectional detail view illustrating the manner of securing the water cooler in position in front of the motor. Fig. 3 is a plan view of the frame of a motor vehicle chassis showing my improved manner of placing or removing the power plant therefrom. Fig. 4 is a sectional detail view of an automatic coupling between the motor and water cooler. Fig. 5 is a sectional detail view illustrating the manner of supporting a starting crank for the motor by the water cooler. Fig. 6 is a sectional side elevation illustrating a modified coupling between the motor and power-transmission mechanism, a friction cone clutch being provided to connect and disconnect the motor with the power-transmission mechanism when in assembled position in the vehicle frame. Fig. 7 is an enlarged side elevation, partly in section, of the means to lock the power plant in assembled position in the frame, showing in dotted lines said means in released position. Fig. 8 is a sectional end detail view taken on the line A—A of Fig. 7, looking in the direction of the arrow. Fig. 9 is a fragmentary view looking at the front of the vehicle frame, illustrating the power plant locked in position therein and the manner of mounting the water cooler; and Fig. 10 is a sectional end detail view taken on the line B—B of Fig. 7, looking in the direction of the arrow.

Similar characters of reference designate like parts throughout the different views of the drawings.

In the embodiment of my invention illustrated in the drawings, the main frame, comprising the side members 11, 12 of channel section connected by cross-bars 13, the cross-bar at the forward end of the frame being bowed to permit of the passage of the power plant, is supported by suitable springs upon a pair of wheel axles 14, 15, the rear axle 15 constituting the driving axle driven through a Cardan shaft 16, and the forward axle 14 having steering mechanism connected thereto.

A power plant comprising an independent and separately removable variable speed power transmitting mechanism unit, (designated in a general way by P,) and a motor unit, (designated in a general way by M,) are provided with circumferentially grooved rollers 17 rotatably mounted on studs projecting laterally from the motor frame and transmission mechanism casing whereby the power plant is supported upon the perpendicular edges of a pair of bars of angle iron 18 rigidly secured to and extending parallel with the side members 11, said bars constituting tracks or a supplemental frame. By providing the rollers 17 with grooves the engagement of the angle iron therein locks the power plant against lateral movement. In the present instance there is provided a jaw clutch 19 between the rear axle driving mechanism and the power transmission mechanism, one member of which clutch is fixed to the Cardan shaft 16 and the other to the drive shaft of the transmission mechanism. A similar clutch 20 is provided between the power transmission mechanism and the motor, one of the clutch members fixed to the driven shaft of the power transmission mechanism and the other member to the power shaft of the motor. It will be obvious as the power plant is placed into position in the front of the frame said clutches will be thrown into operative engagement automatically coupling the power plant with the axle driving mechanism, and that they will readily pull away or be disconnected when the power plant is removed. By this construction I provide a direct and rigid connection between the power shaft of the motor and the rear axle driving mechanism.

To connect and disconnect the motor from the power transmission mechanism when the power plant is locked in position in the frame I provide a suitable clutch, shown in Figs. 1 and 2 as consisting of a multiple disk clutch 21 carried by the casing of the power transmission mechanism, said clutch being actuated by a foot pedal in the usual manner. It will also be noted that the clutches 19, 20 serve as stops to limit the movement of the power plant into the frame.

To rigidly lock the power plant upon the tracks 18 I provide locking bars 22 pivotally connected at one end to studs or brackets 23 projecting up and fixed to the tracks 18, so that they will extend parallel with the tracks above the rollers 17. These locking bars 22 are adapted to engage in the groove of the rollers and are provided with cut out portions 24 conforming to the curvature of the rollers to engage the latter when in locked position, with the forward ends curved downwardly, as shown at 25, Fig. 7. These cut out portions and the curved ends 25 also serve to lock the power plant against axial movement in the frame.

To lock the clamping bars 22 down upon the rollers 17 and thereby the power plant firmly on the tracks 18, I provide levers 26 to each of which levers is connected a pair of links 27, 28, the links 27 being pivotally connected to the bars 22 near the forward ends, as at 29, and the links 28 pivotally supported by brackets 30 fixed to the tracks 18, the said links 27, 28 acting in the nature of toggle joints. When the bar is in its locked position the levers 26 and links 27, 28 will assume the positions shown in full lines in Fig. 7. To release the locking bars the levers 26 are tthrown upward to the dotted line positions, throwing the bars 22 to the dotted line positions through the links 27, 28 thereby releasing the power plant. As a supplemental means to clamp and lock the bars in engagement with the rollers 17 I provide levers 31 pivotally supported by brackets 32 fixed to the tracks 18, links 33 being pivotally connected at one end to the levers, as at 34, and rollers 35 pivotally connected to the free ends to engage with the tops of the bars 22, said rollers 35 having circumferential grooves in which the locking bars also engage. When the bars are in locked positions, said latter means will assume substantially the positions shown in full lines in Fig. 7 with the levers 31 locked by spring latches 31', and when released assume the positions shown in dotted lines.

In the present construction I have shown a motor of the water cooled type in which the water is cooled by passing through a suitable cooler or radiator. This radiator (designated in a general way by R,) is mounted at the front of the vehicle frame, and in order to permit of the ready removal of the power plant I mount or hinge said radiator, as at 36, so that it may be swung on one of its edges away from the front of the vehicle frame, as shown in Fig. 3. The cooler when in position in front of the motor is releasably secured by a bolt 37 passing through a lug or projection 38 forming a part of the frame of the cooler and which may be so constructed as to have the appearance of a hinge to be symmetrical with the hinge 36. The bolt has screw threaded engagement with a lug 39 fixed to the end of the side member 11 within the channel portion. When in this position a pair of pins 40 projecting laterally from opposite sides of the cooler engage over the levers 26 and prevent any accidental upward movement of said levers with the consequent releasing of the power plant.

The engine or motor is connected to the cooler by a pipe 41 to conduct the water from the cooler to the engine and is returned to the cooler by a pipe 42. However, in order that the cooler may be quickly connected to and disconnected from the engine, I provide automatic couplings 43, 44 for said pipes with the cooler, which are in the nature of slip joints having a suitable gasket to firmly engage with the pipe to prevent leakage. The coupling 44 for the outlet pipe from the cooler is provided with valve mechanism to automatically shut off the flow of water from the cooler when disconnected from the engine and opened when connected thereto. Said valve mechanism comprises a seat or support 45 for the stem of a valve 46, said support having a portion engaging in a member 47 projecting from and fixed to the frame of the cooler and secured therein by a pin 48. A sleeve 49 has screw threaded engagement with said support 45 and to which sleeve the coupling 44 is connected, said coupling having a seat 50 in which the valve 46 is normally caused to seat by a spring 51. The sleeve 49 is connected to the cooler R by a pipe or conduit 52. The mounting of the valve support upon the pin 48 permits said support and the coupling to have a slight lateral movement to compensate for any angular position of the cooler relative to the inlet pipe of the engine as it is swung in front of the latter.

In Fig. 5 I have shown means to support an engine starting crank 61 by the cooler, comprising a socket member 62 engaging in an aperture and secured to a downwardly projecting flange 63 of the cooler, the end of the crank being provided with a socket in which the projecting end of the motor shaft engages, said latter shaft having laterally projecting pins 64 to engage in notches in the end of the crank socket when said crank is utilized to start the motor. The crank is normally maintained in position with the notches out of engagement with the pins 64 by a spring 65.

In Fig. 6 I have shown a modification of the clutch mechanism between the motor and power transmitting mechanism units, consisting of a friction cone clutch, one member 53 of which is fixed to the power shaft of the motor and may serve as the fly wheel thereof, while the other member 54 is mounted on the primary shaft 55 of the transmission mechanism to rotate therewith and have sliding movement thereon, the clutch member 54 normally maintained in frictional engagement with the member 53 by a spring 56 confined between said clutch member and a collar 57, and thrown out of operative engagement by the usual foot pedal 58. In this construction to prevent axial movement of the motor and power transmission mechanism one relative to the other, the hub of the clutch member 53 is provided with a bevel recess or bearing 59 in which operatively engages a beveled roller bearing 60 fixed to the end of the shaft 55.

Assuming the power plant to be in locked position in the chassis frame as shown in Fig. 1. Should it be desired to remove either the power transmitting mechanism unit or the motor unit, it is only necessary to release the bolt 37 when the cooler R may be swung away from the front of the motor, the pipes 41, 42 readily pulling out from the couplings 43, 44, and as the pipe 41 is pulled out the valve 46 will be seated by its spring 51 shutting off the flow of water from the cooler. The levers 31 and 26, respectively, are then thrown upward to the dotted line position in Fig. 7 releasing the bars 22 when the power plant may be rolled out from the front of the vehicle frame. When the power plant is again placed in position in the frame to lock the same therein it is only necessary to throw down the levers 26, 31, the shafts of the power plant being automatically alined with the Cardan shaft of the rear axle driving mechanism without any adjustment whatever. The cooler is now again swung in front of the motor and automatically coupled with the pipes 41, 42, the pipe 41 engaging with the valve 46 for the outlet of the cooler as it engages in its coupling 44 forcing it from its seat and maintaining it open against the tension of the spring 51.

Variations may be resorted to within the scope of my invention.

Having thus described my invention, I claim:—

1. In a motor vehicle, the combination with the chassis frame, of a power plant supported by said frame; and means to lock the power plant in position in the frame, comprising a pair of clamping bars pivotally connected at one end to and extending parallel with the frame, and lever mechanism connected to the frame and having a toggle joint connection with the bars to draw and firmly lock the power plant in the frame.

2. In a motor vehicle, the combination with the chassis frame, of a supplemental frame comprising a pair of tracks fixed to and extending parallel with the side members of the frame; a power plant comprising separately and independently removable motor and power transmission mechanism units; rollers rotatably mounted on studs projecting laterally from the motor frame and transmission casing whereby the power plant is supported upon the tracks; and means to lock the rollers on the tracks and thereby the power plant in position in the frame, comprising a pair of clamping bars pivoted at one end to extend parallel with the tracks above the rollers, and lever mechanism to draw and firmly lock the bars upon the rollers.

3. In a motor vehicle, the combination with the chassis frame, of a supplemental frame comprising a pair of tracks fixed to and extending parallel with the side members of the frame; a power plant comprising separately and independently removable motor and power transmission mechanism units; rollers rotatably mounted on studs projecting laterally from the motor frame and transmission casing whereby the power plant is supported upon the tracks;

and means to lock the rollers on the tracks and thereby the power plant in position in the frame, comprising a pair of clamping bars pivoted at one end to extend parallel with the tracks above the rollers, and lever mechanism to draw and firmly lock the bars upon the rollers; said bars having circular recesses and the forward ends curved downwardly, and said recesses and curved ends adapted to engage with the rollers to prevent axial movement of the power plant.

4. In a motor vehicle, the combination with the chassis frame, of a supplemental frame comprising a pair of tracks fixed to and extending parallel with the side members of the frame; a power plant comprising separately and independently removable motor and power transmission mechanism units; rollers rotatably mounted on studs projecting laterally from the motor frame and transmission casing whereby the power plant is supported upon the tracks; a pair of clamping bars pivotally supported at one end to extend parallel with the tracks above the rollers; a link pivotally connected to each of said bars; and levers pivotally connected to said links and to brackets fixed to the tracks whereby to clamp and lock the bars down upon the rollers to maintain them upon the tracks and thereby the power plant in position in the frame.

5. In a motor vehicle, the combination with the chassis frame, of a supplemental frame comprising a pair of tracks fixed to and extending parallel with the side members of the frame; a power plant comprising separately and independently removable motor and power transmission mechanism units; rollers rotatably mounted on studs projecting laterally from the motor frame and transmission casing whereby the power plant is supported upon the tracks; a pair of clamping bars pivotally supported at one end to extend parallel with the tracks above the rollers; a link pivotally connected to each of said bars; levers pivotally connected to said links and to brackets fixed to the tracks; a second lever for each of the bars pivotally connected to brackets fixed to the tracks; links connected to said levers; and rollers rotatably carried by the links to engage with the tops of the bars, whereby to clamp and lock the bars down upon the rollers and maintain them upon the tracks and thereby the power plant in position in the frame.

6. In a motor vehicle, the combination with the chassis frame, of a supplemental frame comprising a pair of tracks fixed to and extending parallel with the side members of the frame; a power plant comprising separately and independently removable motor and power transmission mechanism units supported upon the tracks; and clamping bars extending parallel with and above the tracks to engage over and lock the power plant onto the tracks and thereby in the frame.

7. In a motor vehicle, the combination with the chassis frame, of a supplemental frame comprising a pair of tracks fixed to and extending parallel with the side members of the frame; a power plant comprising separately and independently removable motor and power transmission mechanism units; rollers rotatably mounted on studs projecting laterally from the motor frame and transmission casing whereby the power plant is supported upon the tracks; clamping bars engaging over the rollers; and levers pivoted to brackets fixed to the tracks and having a toggle joint connection with the bars to draw and lock the latter down upon the rollers to maintain them on the tracks and thereby the power plant in position in the frame.

8. In a motor vehicle, the combination with the chassis frame, of a pair of tracks comprising angle iron fixed to and extending parallel with the side members of the frame with an angle portion thereof projecting upward; a power plant comprising independent and separately removable motor and power transmission mechanism units; rollers rotatably connected to said power plant to engage with and whereby the power plant is supported upon the tracks, said rollers having grooves in which the upward projecting portion of the tracks engage; clamping bars pivotally connected at one end to brackets fixed to the tracks, said bars extending parallel with the tracks above the rollers and adapted to engage in the roller grooves; and means to clamp said bars down upon the rollers to maintain them upon the tracks and thereby the power plant in position in the frame.

9. In a motor vehicle, the combination with the chassis frame, of a pair of tracks comprising angle iron fixed to and extending parallel with the side members of the frame with an angle portion thereof projecting upward; a power plant comprising independent and separately removable motor and power transmission mechanism units: rollers rotatably connected to said power plant to engage with and whereby the power plant is supported upon the tracks, said rollers having grooves in which the upward projecting portion of the tracks engage; clamping bars pivotally connected at one end to brackets fixed to the tracks, said bars extending parallel with the tracks above the rollers and adapted to engage in the roller grooves; and means to clamp said bars down upon the rollers to maintain them upon the tracks and thereby the power plant in position in the frame, comprising a link pivotally connected to each of the tracks near the forward ends, and levers pivotally connected to said links and to brackets fixed to the tracks.

10. In a motor vehicle, the combination with the chassis frame, of a pair of tracks comprising angle iron fixed to and extending parallel with the side members of the frame with an angle portion thereof projecting upward; a power plant comprising independent and separately removable motor and power transmission mechanism units; rollers rotatably connected to said power plant to engage with and whereby the power plant is supported upon the tracks, said rollers having grooves in which the upward projecting portion of the tracks engage; clamping bars pivotally connected at one end to brackets fixed to the tracks, said bars extending parallel with the tracks above the rollers and adapted to engage in the roller grooves; and means to clamp said bars down upon the rollers to maintain them upon the tracks and thereby the power plant in position in the frame, comprising a link pivotally connected to each of the tracks near the forward ends, levers pivotally connected to said links and to brackets fixed to the tracks, a supplemental locking lever for each of said bars pivotally supported by brackets fixed to the tracks, links connected to said levers, and rollers carried by said links to engage over the tops of the bars.

11. In a motor vehicle, the combination with the chassis frame, of a pair of tracks fixed to and extending parallel with the side members of the frame; a quick removable power plant adapted to be placed into position in and removed from the front of the frame and supported on said tracks; and clamping bars extending parallel with and above the tracks to engage with and lock the power plant.

12. In a motor vehicle, the combination with the chassis frame, of a pair of tracks fixed to and extending parallel with the side members of the frame; a quick removable power plant adapted to be placed into position in and removed from the front of the frame and supported on said tracks; clamping bars extending parallel with and above the tracks to engage with and lock the power plant upon the tracks; and levers connected to said bars operable to cause the bars to engage with the power plant and to release the bars therefrom.

13. In a motor vehicle, the combination with the chassis frame supported upon a pair of wheel axles, one of said axles having driving mechanism connected thereto, of a pair of tracks fixed to and extending parallel with the side members of the frame; a power transmission mechanism supported upon the tracks; a jaw clutch between the driven shaft of said mechanism and the axle driving mechanism; a motor supported upon said tracks in position in front of the transmission mechanism; said transmission mechanism and motor adapted to be placed in position in and removed from the front of the frame; a jaw clutch between said motor and power transmission mechanism; a second clutch between said motor and power transmission mechanism whereby to connect and disconnect the motor with the axle driving mechanism through the power transmission mechanism at will; and quick releasable means to engage over and maintain the transmission mechanism and motor in position on the tracks.

14. In a motor vehicle, the combination with the chassis frame supported upon a pair of wheel axles, one of said axles having driving mechanism connected thereto, of a pair of tracks fixed to and extending parallel with the side members of the frame; a power transmission mechanism supported upon the tracks; a jaw clutch between the driven shaft of said mechanism and the axle driving mechanism; a motor supported upon said tracks in position in front of the transmission mechanism; said transmission mechanism and motor adapted to be placed in position in and removed from the front of the frame; a jaw clutch between said motor and power transmission mechanism; a second clutch between said motor and power transmission mechanism whereby to connect and disconnect the motor with the axle driving mechanism through the power transmission mechanism at will; and clamping bars extending parallel with the tracks to engage over and lock the motor and power transmission mechanism in position upon the tracks.

15. In a motor vehicle, the combination with the chassis frame, of a power plant comprising a power transmission mechanism and a water cooled engine to occupy a position in front of the transmission mechanism, said power plant adapted to be placed in position in and removed from the front of said frame; a pair of releasable clamping bars extending parallel with and adapted to engage over the power plant to maintain it in position in the frame and a water cooler mounted upon the frame in front of the engine whereby it may be swung upon one of its edges away from and into position in front of the motor.

16. In a motor vehicle, the combination with the chassis frame, of a power plant comprising a power transmission mechanism and a water cooled engine to occupy a position in front of the transmission mechanism, said power plant adapted to be placed in position in and removed from the front of said frame; a pair of releasable clamping bars extending parallel with and adapted to engage over the power plant to maintain it in position in the frame; a water cooler mounted upon the frame in front of the engine whereby it may be swung upon one of its edges away from and into position in front of the motor; and means to lock the cooler in position in front of the engine.

17. In a motor vehicle, the combination with the chassis frame, of a power plant comprising a power transmission mechanism and a water cooled engine to occupy a position in front of the transmission mechanism, said power plant adapted to be placed in position in and removed from the front of said frame; a pair of releasable clamping bars extending parallel with and adapted to engage over the power plant to maintain it in position in the frame; a water cooler mounted upon the frame in front of the engine whereby it may be swung upon one of its edges away from and into position in front of the motor; means to lock the cooler in position in front of the engine; pipes leading to and from the engine and water cooler; and couplings in said pipes whereby as the cooler is swung away from the front of the engine the pipes are automatically disconnected from the cooler and are automatically coupled when swung into position in front of the engine.

18. In a motor vehicle, the combination with the chassis frame, of a power plant comprising a power transmission mechanism and a water cooled engine to occupy a position in front of the transmission mechanism, said power plant adapted to be placed in position in and removed from the front of said frame; a water cooler mounted upon the frame in front of the engine whereby it may be swung upon one of its edges away from and into position in front of the engine; means to lock the cooler in position in front of the engine; pipes leading to and from the engine and water cooler; couplings in said pipes whereby as the cooler is swung away from in front of the engine the pipes are automatically disconnected from the cooler and are automatically coupled when swung into position in front of the engine; and a valve connected to the outlet of the cooler which is automatically closed as the cooler is swung away from the engine and opened when swung into position in front of the engine.

19. In a motor vehicle, the combination with the chassis frame, of a supplemental frame comprising a pair of tracks fixed to and extending parallel with the side members of the frame; a power plant comprising separately and independently removable motor and power transmission mechanism units supported upon the tracks; and means to lock the power plant in position on the tracks comprising a pair of clamping bars pivotally connected at one end to and extending parallel with the tracks, and lever mechanism connected to the tracks and having a toggle joint connection with the bars to draw and firmly lock the power plant upon the tracks.

WILLARD IRVING TWOMBLY.

Witnesses:
ARTHUR J. BENDIX,
PAULA PHILIPP.